United States Patent [19]

Cate et al.

[11] Patent Number: 5,089,976
[45] Date of Patent: Feb. 18, 1992

[54] COLOR NORMALIZATION PROCESS

[75] Inventors: Robert B. Cate, La Jolla; Daniel E. Wulbert, Cardiff, both of Calif.

[73] Assignee: Friends of the UCSD Library, Inc., La Jolla, Calif.

[21] Appl. No.: 555,099

[22] Filed: Jul. 18, 1990

[51] Int. Cl.$^5$ .............................................. G01J 3/50
[52] U.S. Cl. ..................................... 364/526; 356/402
[58] Field of Search ......................... 364/526; 356/402

[56] References Cited

U.S. PATENT DOCUMENTS 2,571,697 10/1951 Evans ........................................ 95/2
4,648,051 3/1987 Wandell et al. ...................... 364/526

OTHER PUBLICATIONS

Dannemiller, J. L., Computational Approaches to Color Constancy: Adaptive and Ontogenetic Considerations, 1989, Psychological Review, vol. 96, pp. 255-266.

Maloney, L. T., and B. A. Wandell, Color Constancy: a method for recovering surface spectral reflectance, 1986, Journal of the Optical Society of America, vol. 3, pp. 29-33.

Mach, E., On the influence of spatially and temporally varying light stimuli on visual perception, 1906, in Mach Bands: Quantitative studies on neural networks in the retina, by Floyd Ratliff, pp. 321-322, Holden-Day, Inc., San Francisco, London, Amsterdam, 1965.

Land, E. H., An alternative technique for the computation of the designator in the retinex theory of color vision, 1986, Proceedings of the National Academy of Sciences U.S.A., vol. 83, pp. 3078-3080.

Benson, W., The Natural system of colours, 1868, in Principles of the Science of Colour, by same author, Chapter VII, pp. 18-21, Chapman and Hall, London.

Clark, C. A., R. B. Cate, M. H. Trenchard, J. A. Boatright, and R. M. Bizzell, Mapping and classifying large ecological units, 1986, Bioscience, The Biologists Toolbox, vol. 36, pp. 476-483.

Botkin, D. B., J. E. Estes, R. M. MacDonald and M. V. Wilson, Studying the Earth's Vegetation from Space, 1984, BioScience, vol. 34, 508-514.

Hunt, R. W. G., Integrating to grey, 1967, In The Reproduction of Colour, by same author, pp. 267-269, John Wiley & Sons, Inc., New York, London, Sydney and Toronto.

Judd, D. B., Ideal Color Space, 1970, In Contributions to Color Science, D. L. McAdam, editor, pp. 637-653, National Bureau of Standards Special Publication 545, (1979), U.S. Dept. of Commerce, Washington, D.C.

Nicodemus, F. E., J. C. Richmond, J. J. Hsia, I. W. Ginsberg, and T. Limperis, Geometrical Considerations and Nomenclature for Reflectance, 1977, pp. 1-12, 37-43, National Bureau of Standards Monograph 160, U.S. Dept. of Commerce, Washington, D.C.

Cornsweet, T. N., Psychophysiology of Brightness II, Modulation Transfer Functions, 1970, in Visual Perception, by same author, Chapter XII, pp. 311-364, Academic Press, New York and London.

Primary Examiner—Parshotam S. Lall
Assistant Examiner—S. A. Melnick

[57] ABSTRACT

A scientifically explained color normalization process for producing image and information arrays which correspond to human color perception and description and are substantially invariant under varying conditions of illumination intensity and measurements geometry. New radiation measurements obtained by a three waveband sensor (10) are normalized by a computer or equivalent device using an individual waveband normalization algorithm (12) which divides each measurement by the mean of about ten thousand surrounding measurements, thus extracting the maximum resolution relational reflectance factor. The combined three waveband normalized array is presented as a color-coded alphanumeric array in terms of MUNSELL hue, value and chroma, using a cylindrical coordinate transformation algorithm (14) and a MUNSELL conversion algorithm (16). The normalized array is also presented using a balanced image display device (18), based on either additive or subtractive primaries.

1 Claim, 2 Drawing Sheets

COLOR NORMALIZATION PROCESS

BACKGROUND

1. Field of Invention

This invention relates to processing of electromagnetic radiation measurements into images and information arrays which correspond to normal human color vision.

2. Description of Prior Art

Raw measurements of electromagnetic radiation (EMR) in three wavebands are commonly converted to color images for subsequent visual appreciation or analysis by human observers, as in photography, television, printing, etc. EMR measurements are also processed into color-coded information arrays that serve as inputs to artificial intelligence applications, such as expert systems, quality control and robotics. Separate EMR measurements of a single set of objects, i.e, a single scene, will vary with changes in the illumination intensity levels and the geometry of the measurements, i.e., the illumination and viewing angles relative to the objects. It is the prevailing consensus of physicists that information on the inherent spectral reflectance properties of objects, popularly known as their color, cannot be extracted from EMR measurements unless the illumination levels and the measurement geometry are known, or a reference standard is available. On the other hand, human vision, which usually lacks this knowledge, is characterized by a degree of color constancy which has never been satisfactorily explained. This approximate constancy of the colors humanly perceived in a single scene, despite differences in illumination and in measurement geometry, is of great value to humans in their environmental interactions. It would be highly desirable to achieve such constancy by artificial means for use in the types of applications mentioned above, i.e., for both human and artificial intelligence consumers.

The prior art related to color constancy can be conveniently divided into two categories—reflectance-oriented and empirical. The first category consists of processes designed to recover the surface spectral reflectances of objects, i.e., the percentages of incident light reflected in each wavelength or waveband. All processes in this category are mathematically based and rely on assumptions about the scene content, the illumination and the measurement geometry, which either do not always hold or are so restrictive as to be impractical for most applications. These computational approaches have been reviewed recently by Dannemiller. The most advanced is probably that of Brian A. Wandell and Laurence T. Maloney (Stanford University), U.S. Pat. No. 4,648,051, entitled COLOR IMAGING PROCESS, Mar. 3, 1987. This process claims to recover both illumination and reflectance, where both are completely unknown. However, a scientific journal article published by the inventors after the patent application specifically states that their process is restricted to "the analysis of a single image drawn from a scene with fixed geometric relations among objects, light sources, and the visual sensor array". This geometrical restriction severely limits the utility of their process, since in many potential applications the geometry frequently changes. The inventors also state in the same article, "Indeed, without restrictions on the range of lights and surfaces that the visual system will encounter, color constancy is not, in general, possible."

The second category of prior art comprises those empirical approaches which attempt to match human color perception without scientific explanation. One such approach is that of Ralph M. Evans (Kodak) (U.S. Pat. No. 2,571,697, Oct. 16, 1951), entitled METHOD FOR CORRECTING PHOTOGRAPHIC PRINTS. This process has the objective of making color prints that will be judged satisfactory by amateur photographers. The principle is to equate the overall average densities of cyan, yellow and magenta in the image so that the whole picture "integrates" or averages to gray. A second empirical approach is the well-known photographic technique of dodging or unsharp masking. The basic principle is to equalize exposure levels at high spatial frequencies by eliminating low spatial frequency contrast. The idea is based on the discovery by Ernst Mach that human vision employs a similar process. Digital variations of the process are numerous and are often called local adaptive enhancement. Land's many algorithms are versions of this approach. A third empirical approach related to the color reproduction problem is the cubic model of color space devised by Benson in 1868. This is a model of color space, based on prismatic spectra, which illustrates the humanly perceived rules of color mixing, i.e., the empirical relationships seen to result from combining either the additive primary wavebands (blue, green and red) or the subtractive primary wavebands (cyan, yellow and magenta) in different proportions.

The key elements of these three empirical approaches were combined by Clark et al in an experimental process for standardizing digital images of the earth obtained by satellite-borne sensors. The purpose was to automate image interpretation by adapting to computers the essential features of human color vision, as understood empirically.

Although the empirical approaches cited above have often received pragmatic and commercial approval, they have failed to achieve scientific credibility because of lack of physical explanation for their apparent success. In patent law terms, they have been considered by experts in the art to be inoperable, or at least unreliable. For example, an image processed as described by Clark et al. appeared on the cover of the September 1984 Global Ecology issue of Bioscience. However, the process was dismissed by Botkin et al. as follows, "Although (the) images resemble what one sees on a map, the exact relationships between the satellite instruments' response and the actual characteristics of the land surface remain a research question." According to Hunt, similar skepticism appears in the British version of the Evans patent cited above, which apparently includes the sentence, "A more pleasing effect is often produced in color prints if they are so made that *instead of the color balance being correct*, in which gray is printed as gray, it is so adjusted that the whole picture integrates to gray." (underlining added) Local enhancement techniques are generally considered to be ad hoc and unreliable because they are usually tailored to individual images on a subjective basis. Finally, the Benson color cube has been virtually ignored by physicists, presumably because it has lacked a theoretical explanation.

In summary, all of the color normalization processes and models heretofore suggested suffer from one or the other of two disadvantages:

(a) they are unable to recover constant images of the same scene under varying conditions of illumination intensity and measurement geometry, or
(b) their success in matching human color perception cannot be explained scientifically.

OBJECTS AND ADVANTAGES

Accordingly, the principal objects and advantages of the present invention are:
(a) to provide a color normalization process which has a sound scientific explanation for its operability;
(b) to provide a color normalization process which produces images and information arrays of a scene which are substantially invariant with respect to both illumination intensity levels and measurement geometry; and
(c) to provide a color normalization process which produces images and information arrays which agree with human color perception and description.

DRAWING FIGURES

REFERENCE NUMERALS IN FIG. 1

10 three waveband sensor
12 individual waveband normalization algorithm
14 cylindrical transformation algorithm
16 MUNSELL conversion algorithm
18 balanced image display device.

DESCRIPTION—FIG. 1 AND 2.

Figure 1:
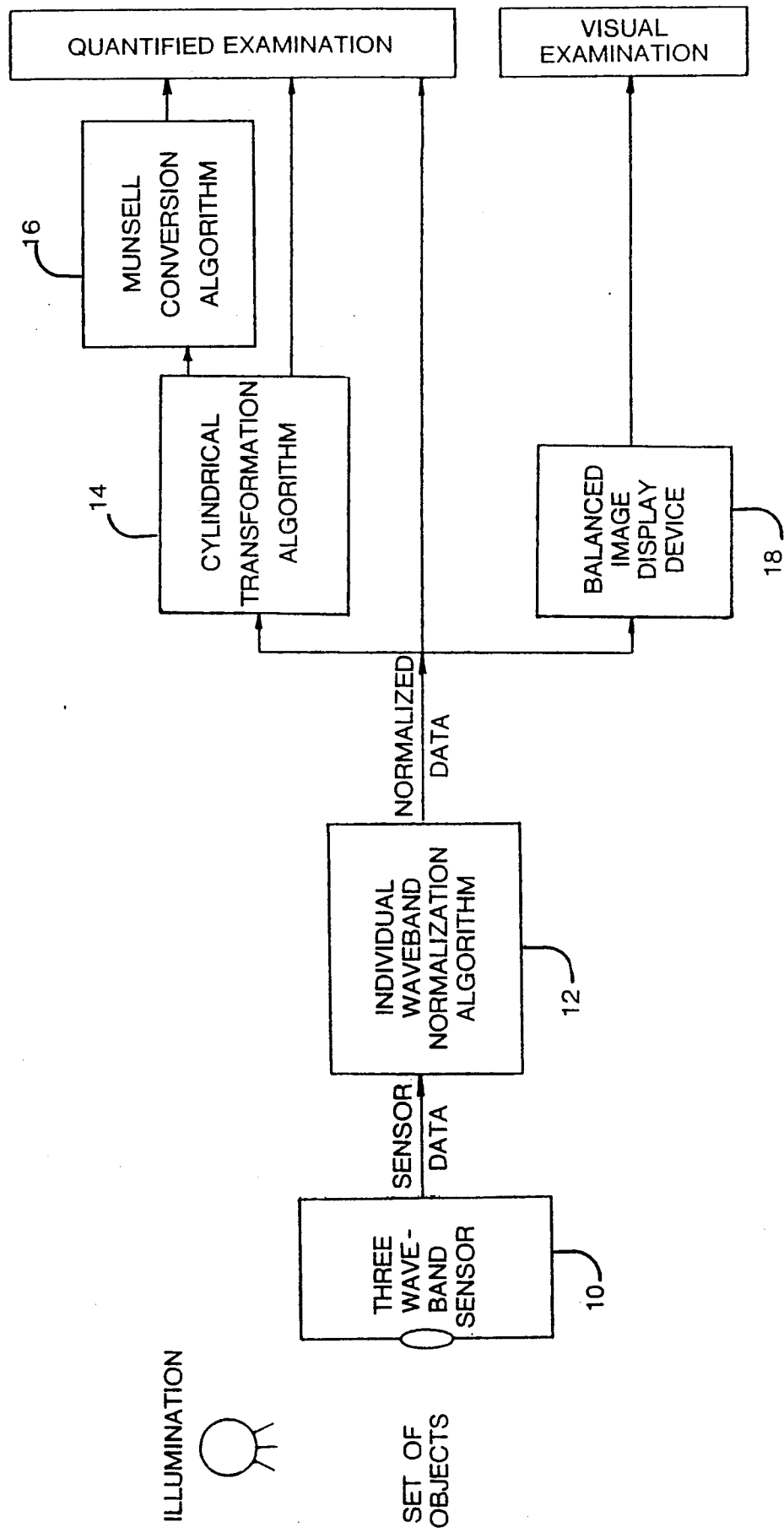
FIG. 1 shows a block diagram flowchart of the process.

A block diagram of an illustrative system incorporating the preferred embodiment of the present invention is shown in FIG. 1. The system includes the following elements:

A radiometric sensor with three wavebands 10 measures radiation from a scene, i.e., a set of objects, simultaneously in three wavebands producing as output three arrays corresponding to measurements of the scene in each of the three wavebands. If natural color is desired the wavebands used are approximately 400-500 nanometers (nm), 500-600 nm and 600-700 nm, corresponding to blue, green and red (BGR), respectively. Other sets of wavebands can also be used and later treated as BGR equivalents. Such an embodiment is known in the art as a false color system. The invention places no specific requirements on the type and specifications of the sensor, although its performance will, of course, affect the accuracy of the measurements. It is particularly important to minimize overlapping waveband sensitivity.

A normalization algorithm 12 uses a computer or equivalent device to normalize the individual waveband measurements made by the sensor 10. In the preferred embodiment each radiation measurement in each waveband array, i.e., each picture element or pixel, is divided by the mean of a sub-array of approximately 100×100 surrounding measurements. This mean is separately calculated for each pixel. The computational device employed for this purpose can be any one of a number of digital, analog, optical or photographic instruments well-known in the art, or any obvious modifications of these. The invention places no specific requirements on choice of the device, although its performance will, of course, affect the accuracy of the output, which is a combined three waveband information array of normalized data.

Figure 2:
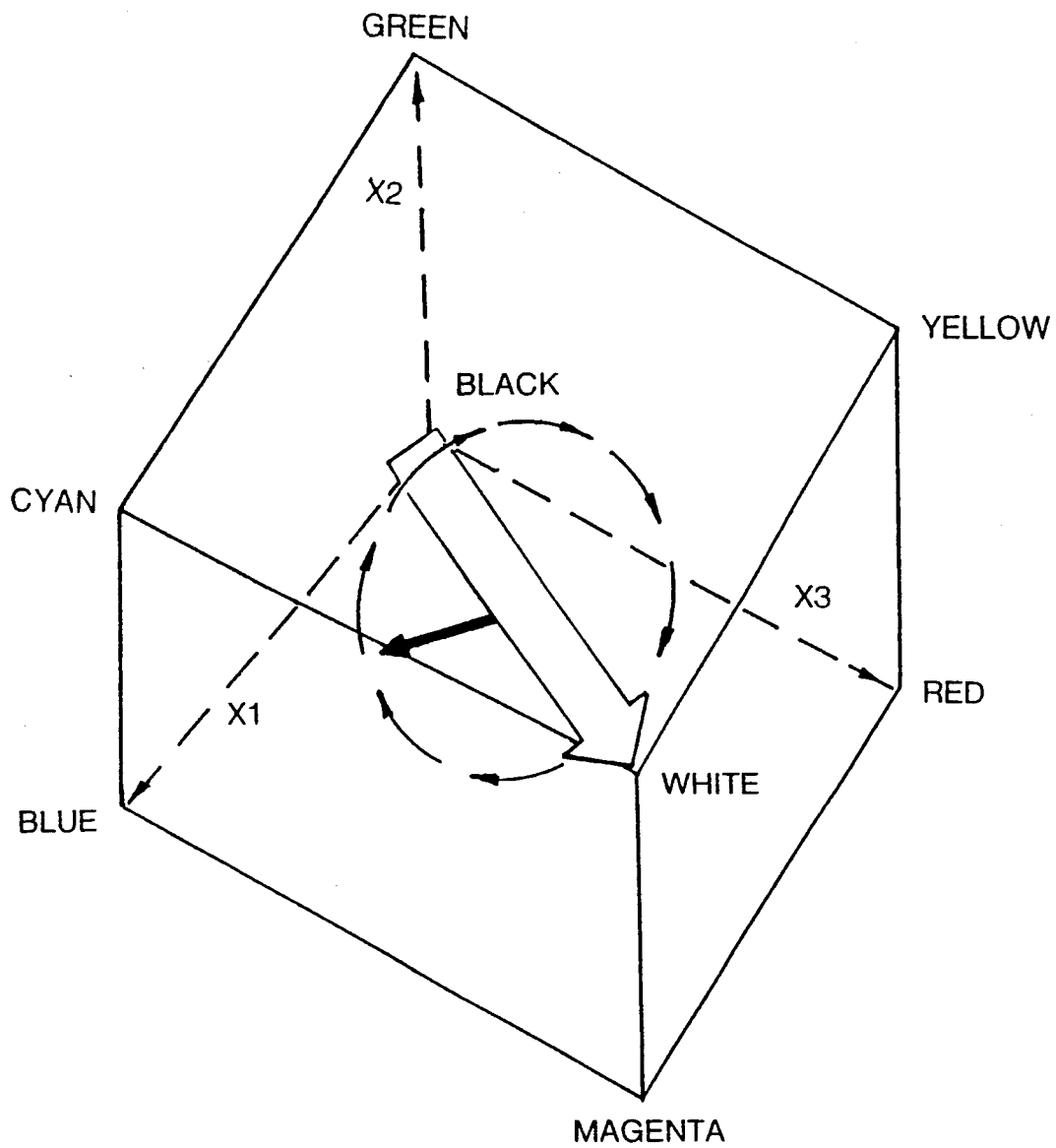
FIG. 2 shows coordinate relationships in the color cube.

A transformation algorithm 14 transforms the output of normalization algorithm 12 to a cylindrical coordinate system with dimensions of hue, value and chroma (HVC), using the equations given in Table 1. (See FIG. 2.)

TABLE 1

Equations for Hue, Value, and Chroma

| | | |
|---|---|---|
| Value | = | $S/3$ |
| Chroma | = | $(A - S*S/3)^{\frac{1}{2}}$ |
| Theta | = | $\text{Arcos} \dfrac{(X1 + X3 - 2X2)}{2(A - X1X2 - X1X3 - X2X3)^{\frac{1}{2}}}$ |
| Hue | = | Theta if $X1 > X3$ |
| Hue | = | $360 - $ Theta if $X1 < X3$ |
| WHERE: | A = | $X1*X1 + X2*X2 + X3*X3$ |
| | S = | $X1 + X2 + X3$ |
| | X1 = | normalized blue input |
| | X2 = | normalized green input |
| | X3 = | normalized red input |

Note: The maximum input of X1, X2 and X3 should be 2.0.

The output is an information array of the scene coded in HVC equivalents. Hue and chroma are, respectively, the polar angle and distance coordinates of points in X1X2X3 planes orthogonal to the origin, with the X1, X2 and X3 axes being mutually perpendicular from the origin. Value is the distance of the center of a point's plane from the origin. Note that the plane centers lie on a line which is equidistant from the X1, X2 and X3 axes, thus differing from the normal construction of cylindrical coordinates. Also note that inputs are limited to a maximum of 2.0 to preserve the cubic symmetry which is discussed under Step 2 in the section on Operation.

A conversion algorithm 16 converts the HVC data from transformation algorithm 14 to MUNSELL color equivalents using the equations in Table 2.

TABLE 2

MUNSELL Conversion Equations.

| | | |
|---|---|---|
| MH | = | $91.667 - .27778$ TH* |
| MV | = | $5.0$ TV |
| MC | = | $10.0$ TC |

(MH = MUNSELL numeric hue, MV = MUNSELL value, MC = MUNSELL chroma, TH = transformation hue, TV = transformation value, TC = transformation chroma)
*If MH is negative, add 100.

The MUNSELL alphanumeric equivalents of the MUNSELL numeric hues are then obtained as follows. Each 0.1-10.0 incremental range on the 0.1-100.0 MH scale is assigned a hue letter designation in the following order: R, YR, Y, GY, G, BG, B, PB, P and RP. (R is red, Y is Yellow, G is Green, B is Blue and P is Purple.) The alphanumeric designation then consists of the actual numeric increment and its hue letters. For example, 2.5=2.5R, 12.5=2.5 YR, 22.5=2.5Y, and so on to 100.0=10.0RP. Finally, the complete MUNSELL color designation consists of the alphanumeric hue followed by value/chroma, e.g., a color which is 5.0Y with a value of 6.7 and a chroma of 8.2 is written 5.0Y 6.7/8.2. The published MUNSELL color charts consist of pages at alphanumeric hue intervals of 2.5. Each page of the full MUNSELL Book of Color contains opaque paint samples of each value/chroma integer combination of that hue which could be produced with pigments available at the time of publication. The value range is 0-10 and the chroma range is 0-16. See Judd for further details. MUNSELL is a trademark of the Macbeth Division of the Kallmorgen Corporation, 2441 North Calvert Street, Baltimore, Md. 21218. The output of conversion algorithm 16 is an information array of MUNSELL colors which approximate those which a human observer would match to the original set of measured objects.

A balanced image display device 18 such as a cathode ray tube, photographic film emulsion, halftone print, or an equivalent device, is used to present the combined results of the normalization algorithm 12 as an optical image. In the preferred embodiment, display device 18 should be balanced in three respects. One, the gain applied to each waveband should be linearized so that a normalized input level of 1.0 is output half way between zero and the device maximum, and the slope is constant. Two, the gains applied to the three wavebands should be balanced so that equal amounts of BGR at any normalized level will always appear achromatic (gray) to a normal human observer. For example, if display device 18 has intensity levels of 0-255, as is commonly the case, the BGR gains should each be 127 and normalized values equal to or greater than 2.0 should be displayed as 255. Linearity and achromaticity should be verified by a gray scale standard which has two parallel sets of reference blocks at varying intensity levels of display device 18. At each gray scale level one block should have each pixel illuminated with equal levels of each waveband, e.g., 127-127-127. The other member of the gray scale pair of blocks should consist of two kinds of pixels, black (0-0-0) and white (255-255-255), evenly spaced in proportions equivalent to the desired gray level. For example, at the gray scale level of 127 there should be 50% black and 50% white pixels. When the two sets of blocks are displayed and viewed at a distance where the normal human observer cannot resolve individual pixels, there should be no discernible difference between members of any pair of blocks. Similarly, EMR measurements of each block should be identical within each pair.

Three, the color output of display device 18 should be verified by comparing output test patterns with MUNSELL color chips. Test patterns corresponding to particular MUNSELL colors can be readily constructed by using the equations of Table 3, which are the inverses of the equations in Tables 1 and 2.

TABLE 3

Inverses of Equations in Tables 1 and 2.
MH = MUNSELL numeric Hue, MV = MUNSELL Value,
MC = MUNSELL Chroma TH = −3.6 (MH − 91.6667) Note: If TH < 0, TH = 360 + TH
TV = MV/5
TC = MC/10
X2 = TV − TC .8165 cosTH
X1 = (3TV − X2 ± [2TC$^2$ − 3$(TV-X2)2$]$^{\frac{1}{2}}$)/2*
X3 = 3TV − X2 − X1
*If TH < 180 use +
*If TH > 180 use −

The calibration criteria described herein represent optimum performance with no waveband overlap. In practice some compromise may be necessary. However, the output of display device 18 should be an image which approximately matches a normal human observer's perception of the original scene in terms of MUNSELL colors.

OPERATION—FIGS. 1 AND 2.

The process can be implemented as shown in the flow chart in FIG. 1, which will now be discussed as a series of operational steps.

Step 1: Input each of the measurement arrays from the sensor 10 to the normalization algorithm 12. In order to avoid boundary effects in static images of fixed dimensions (stills), it is usually necessary to use for computation and then discard a border about fifty pixels wide on all four sides of each array. The non-border pixels then form a reduced array which can be placed into a smooth mosaic of adjacent still images for an enlarged field of view. The point here is that the size of a scene is arbitrarily limited by the field of view of the sensor, but potentially the scene comprises a sphere surrounding a fixed point of observation. Any given segment of the sphere captured by the sensor's field of view at an instantaneous orientation requires a fifty pixel border for computation of normalized values. This problem can be overcome either by restricting the final normalized image to exclude the border, or by changing the orientation of the sensor so that the entire sphere, or any desired portion thereof, can be measured, normalized and reconstructed from adjacent normalized segments. The same reasoning applies to adjacent stills taken by a moving sensor. In any case the output of step 1 is a three waveband array of normalized data which is invariant with respect to illumination levels and measurement geometry, as will be explained in the section below on Theory of Operation. This output serves as input to both step 2 and step 4.

Step 2: Input the normalized data from step 1 to transformation algorithm 14, which changes the normalized BGR pixel designations to cylindrical HVC coordinates. This is a transformation of the Benson color cube cited under Prior Art and now described in greater detail. (See FIG. 2.) Two diagonally opposite apices of the cube are assigned to black and white. The black apex is the origin of the additive primaries, BGR, and the three apices closest to black represent saturated (pure) BGR. Similarly, the white apex is the origin of the subtractive primaries, cyan, yellow and magenta (CYM), and the three apices closest to white represent saturated CYM. The six primary apices are arranged around the black-white axis, the locus of value, in the order B-C-G-Y-R-M, thus corresponding to the basic empirical rules of color mixing shown in Table 4. For example, B+G=C, C+Y=G, etc.

TABLE 4

| Basic Empirical Rules of Color Mixing | |
|---|---|
| Additive Primaries | Subtractive Primaries |
| Blue + Green = Cyan | Cyan + Yellow = Green |
| Green + Red = Yellow | Yellow + Magenta = Red |
| Red + Blue = Magenta | Magenta + Cyan = Blue |
| Blue + Green + Red = White | Cyan + Yellow + Magenta = Black |

After step 2 the primary apices have the HVC dimensions shown in Table 5.

TABLE 5
Input-Output of Step 2 for the Primary Colors.

| Primary | Input X1 | Input X2 | Input X3 | Output Hue (in degrees) | Value | Chroma |
|---|---|---|---|---|---|---|
| Blue | 2.0 | 0.0 | 0.0 | 60 | .667 | 1.633 |
| Cyan | 2.0 | 2.0 | 0.0 | 120 | 1.333 | 1.633 |
| Green | 0.0 | 2.0 | 0.0 | 180 | .667 | 1.633 |
| Yellow | 0.0 | 2.0 | 2.0 | 240 | 1.333 | 1.633 |
| Red | 0.0 | 0.0 | 2.0 | 300 | .667 | 1.633 |
| Magenta | 2.0 | 0.0 | 2.0 | 360 (0) | 1.333 | 1.633 |

Step 3: Input the transformed data from step 2 to conversion algorithm 16, which converts the transformed HVC information arrays to the nomenclature of the MUNSELL color system. As Judd has explained, the MUNSELL system of color notation is based on human judgement of equal HVC spacing of opaque color samples. This step permits human observers to quantify their visual judgements of scene content and provides an interface between human and computerized interpretations of the normalized image. This interface is particularly desirable for calibration of display device 18 and monitoring of artificial intelligence applications such as expert systems, automated quality control, robot programming, etc. Obviously, in some such applications the output from step 1 or step 2 can be used directly, as is indicated by multiple paths in FIG. 1.

Step 4: Input the normalized data from step 1 to display device 18. This step produces a standardized image which maintains the proportions of the normalized BGR combinations obtained in step 1. This image is designed for human viewing as in conventional television, photography and halftone printing, as well as for monitoring of artificial intelligence applications.

Clearly, all of these steps may not be essential for all embodiments of the invention. However, they are described here to illustrate the scope of the process in the preferred embodiment, which emphasizes provisions for calibration and monitoring.

THEORY OF OPERATION

1. Normalization

At the end of Step 1 it was stated that the normalized BGR array is invariant with respect to illumination intensity and measurement geometry. In order to explain this we will first consider only changes in illumination intensity. Suppose m surfaces are to be observed and at time t they have reflectance respectively of $r_1(t)$, ..., $r_m(t)$. At time t let the ambient light intensity be $s(t)$. The data recorded during an observation at time t would be: $s(t)r_1(t), \ldots, s(t)r_m(t)$. The sum of the collected data is:

$$\sum_{i=1}^{m} s(t)r_i(t) = s(t) \sum_{i=1}^{m} r_i(t).$$

Hence the ith observed surface value, $s(t)r_i(t)$, divided by the mean of the collected data becomes:

$$Q_i(t) = \frac{r_i(t)m}{r_1(t) + \ldots + r_m(t)}.$$

where these values, $Q_i(t)$, are the quotients obtained through division by the mean, and are independent of the illumination at time t.

This invariant quotient Q might be termed relational reflectance were it not for the fact that reflectance itself varies with measurement geometry. This has been explained by F. E. Nicodemus et al. However, there is another inherent property of surfaces which Nicodemus et al. call the reflectance factor, defined as, "the ratio of the radiant flux actually reflected by a sample surface to that which would be reflected into the same reflected-beam geometry by an ideal (lossless) perfectly diffuse (lambertian) standard surface irradiated in exactly the same way as the sample." Further, "in the case of almost lambertian reflectors, the reflectance factor is nearly independent of beam orientation". Thus, Q might be called the relational reflectance factor.

However, the preceding paragraph implicitly assumes that each measurement is divided by the mean of all measurements of the set taken at time t. There is the additional complication of spatial frequency. According to optical modulation transfer theory, which is well substantiated be experiment, maximum low spatial frequency intensity modulation and maximum high spatial frequency resolution are separated by approximately two orders of magnitude of spatial frequency in each planar dimension. Therefore, to insure optimum separation of high and low frequency information, the optimum size of the denominator in the normalization equation is about 100×100 pixels, and Q should be called the maximum resolution relational reflectance factor. For convenience, we will refer to it as the Q factor in the ensuing discussion.

It follows from the above that since (a) the Q factor is invariant with respect to illumination intensity, and (b) the Q factor is linearly correlated with the reflectance factor within a given set of objects, and (c) the reflectance factor of nearly lambertian objects is nearly invariant with respect to measurement geometry, the Q factor is substantially invariant with respect to both illumination intensity and measurement geometry. Furthermore, as the solid angle subtended by an object increases, the Q factors of its component pixels become increasingly invariant with respect to pixels comprising surrounding objects. For example, at normal reading distance with 20/20 vision, most of the interior detail of an ordinary postage stamp is nearly invariant with respect to the color of the surface on which it is placed. Finally, since the Q factor always has a mean of 1.0, the output of a color normalization process based on Q factors will always be balanced with respect to BGR means. In other words, it will automatically integrate to gray in the sense of the Evans patent cited previously.

2. Relationship to Human Color Perception

It is generally accepted that color is perceived by humans as both constant and balanced, which we have just shown are characteristics of a color system based on Q factors. It is also generally accepted in the art that human vision is based on a neurophysiological process known as lateral inhibition, which is equivalent to division of each pixel by the mean of surrounding measurements. The absolute maximum resolution or pixel size, and the absolute size of the surrounding area (known as the receptive field) are not precisely known. However, Cornsweet has assembled considerable evidence on the subject of lateral inhibition and his graphs indicate that the relative size of the receptive field is about the same as the area of 100×100 pixels discussed above. Therefore, it is logical to conclude that human color perception is based on the Q factor.

This conclusion is strengthened by the observation that the Q factor HVC transformation of the Benson color-mixing cube and the HVC of the MUNSELL equal interval color space are equivalent as is shown in Table 2. The apparently irregular shape of the MUNSELL space is due to the unavailability of pigments necessary to produce permanent examples of the very high chroma opaque paints that would correspond to colors near the edges of the Benson cube. Thus, the Benson-MUNSELL cube corresponds to the ideal color space discussed by Judd, i.e., "a tri-dimensional array of points, each representing a color, so located that the length of the straight line (straight in the Euclidean sense) connecting any two points is proportional to the perceived size of the difference between the colors represented by the points."

Summary, Ramifications and Scope.

Accordingly, the reader will see that the color normalization process of this invention has a sound mathematical any physical foundation and produces object colors that agree with human color perception, including approximate constancy under varying conditions of illumination intensity and measurement geometry, so long as object reflectances are predominantly diffuse (lambertian). In addition, the invention can be used both to display normalized images and to code them in terms of human descriptive standards. The process is therefore suited to a wide variety of uses, ranging from simple color normalization and balancing for human appreciation to complex artificial intelligence applications.

Although the description above contains many specificities, these should not be construed as limiting the scope of the invention, but merely as providing illustration of some of the presently preferred embodiments of the process. For example, in many cases the size of the surrounding area used for normalization can vary considerably without noticeable degradation of the image. This means that the amount of discarded boundary in still images can often be reduced and the computation simplified.

The discussion to this point has referred only to the use of additive primary colors. However, it has been explained previously that the cubic color model used in transformation algorithm 14 is also symmetrical with respect to the substractive color primaries used in photography, halftone printing and other dye-based processes. As a result, display device 18 can also be based on the Q factor input relationships: $cyan = 2 - X3(red)$, $yellow = 2 - X1(blue)$, and $magenta = 2 - X2(green)$. Similarly, the same dual gray scale and MUNSELL test patterns can be used for calibration. Thus, all of the advantages of this invention apply equally, whether display device 18 is based on additive or subtractive primaries.

As a further example of its scope, the invention can also be used to produce normalized BGR images of data originally measured in any three wavebands, not being limited to BGR. This is a common substitution known in the art as false color.

Thus the scope of the invention should be determined by the appened claims and their legal equivalents rather than by the examples given.

We claim:
1. A color normalization process comprising the traditional steps of
   (a) defining a plurality of radiation wavebands,
   (b) performing spatial array measurements of an object or objects in each of these wavebands to produce arrays of data,
   (c) normalizing said arrays to remove unwanted variation,
   (d) converting the normalized data to a standard color system, and
   (e) presenting the results as optical images and corresponding information arrays;
the improvement comprising two elements,
   (1) a means in step (c) for optimizing the extraction of relational information through division of each measurement by the mean of about 10,000 surrounding measurements; and
   (2) a means in step (d) for converting said relational information to the MUNSELL color system.

* * * * *